No. 711,228. Patented Oct. 14, 1902.
F. H. RICHARDS.
PLAYING BALL.
(Application filed June 14, 1902.)
(No Model.)
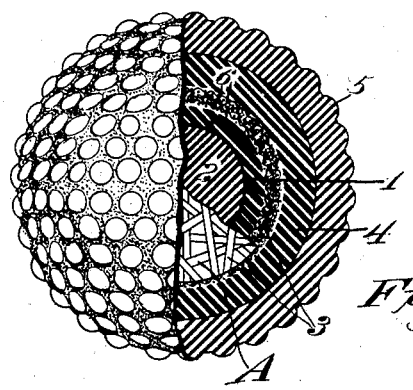
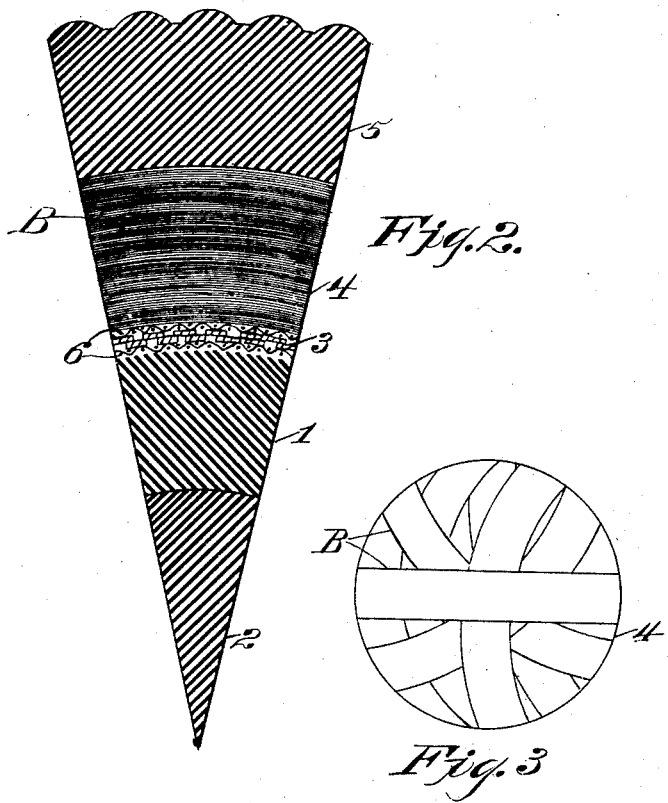
Witnesses:
C. H. Kelsey.
Herbert J. Smith
Inventor:
F. H. Richards.
THE NORRIS PETERS CO., PHOTO-LITHO., WASHINGTON, D. C.

UNITED STATES PATENT OFFICE.

FRANCIS H. RICHARDS, OF HARTFORD, CONNECTICUT, ASSIGNOR TO THE KEMPSHALL MANUFACTURING COMPANY, A CORPORATION OF NEW JERSEY.

PLAYING-BALL.

SPECIFICATION forming part of Letters Patent No. 711,228, dated October 14, 1902.

Application filed June 14, 1902. Serial No. 111,782. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention relates to playing-balls, especially those used in the game of golf; and its object is to produce at a low cost a ball having exceptional flying power under a hard blow, but inactive under a light blow.

In the drawings forming part of this specification, Figure 1 is a view of a ball made in accordance with my present improvements and shown partly in section. Fig. 2 is a sectional detail upon a larger scale. Fig. 3 is a view of the filling of the ball.

The interior of the ball preferably comprises a sphere 1, which preferably consists of soft rubber under tension, preferably molded solid rubber, the tension being produced by the injection thereinto of a center piece 2, of gutta-percha or other material, substantially in the manner set forth in the patent granted to me March 25, 1902, No. 696,353. If desired, an untensioned molded rubber sphere may be used in place of the tensioned sphere 1. Upon said sphere I flex or bend continuously in miscellaneous directions one or more lengths of a wire spring 3, thereby forming a tense metallic casing or lattice-work A, which thus consists of a series of irregularly-arranged tense bands or hoops. The wire is preferably flat or oblong in cross-section and wound flatwise upon the rubber sphere 1, and the number of the windings may be varied to suit the ball to different games or to give it different qualities. The spring-wire before winding may be substantially straight and flexed or constrained at each winding, thereby making a tension in the wire, so that each hoop or band tends constantly to recover its normal straight condition, and hence every portion of the casing A is in a state of high initial tension, which is a feature of great importance. Moreover, since the wire is wound upon the rubber sphere 1 under great longitudinal tension it holds said sphere under high compression. The structure hence comprises a sphere of soft rubber which is bound tightly within windings of longitudinally-unyielding wire, said wire itself being highly tensioned by the bending and shows enormous activity when given a heavy blow. It will be perceived that since the wire casing A holds the rubber sphere 1 in a powerful grip the tendency upon the part of both the rubber sphere and the casing is to preserve a spherical form, and therefore great resistance is offered to any distortive tendency, or, in other words, a blow in order to distort the wound sphere must overcome the powerful tendency thereof to preserve its spherical form and must do this against the great opposition offered by the highly-tensioned springs which compose the casing. The reaction of the device is instantaneous and powerful, and hence an enormous amount of power may be imparted to the ball, thus prolonging its flight. Wire having other cross-sections and of any suitable spring metal may be used. Upon this compound center piece I apply sheet-caoutchouc, layer over layer, to complete the filling 4 of the ball, and upon this filling I place a shell 5, of plastic material, preferably gutta-percha and preferably holding the filling under compression.

In building up the sphere 4 I employ approximately pure caoutchouc in very thin sheet form, this being similar to "rubber dam" or surgeons' rubber and being either unvulcanized or acid cured and containing little or no foreign mixture to impair its elasticity. This sheeting I wind continuously in miscellaneous directions layer over layer, as indicated at B, Figs. 2 and 3. I prefer to use sheeting originally from nine one-thousandths to twelve one-thousandths of an inch in thickness and tensioned to an extent to reduce its thickness to from three one-thousandths to four one-thousandths of an inch. By reason of its extraordinary thinness the caoutchouc winds very compactly, forming a solid body—that is, a body containing no perceptible crevices. The highly-tensioned caoutchouc sheeting has not only the advantage of being extremely elastic and not only packs closely layer upon layer to form a solid ball, but it will also be seen that because of its thinness a great number of layers can be compacted within the allotted space, and since each layer is independently tensioned a large amount of power is thereby stored up in the ball. My filling therefore consists of a solid ball of rubber whose different portions are tensioned in miscellaneous directions, each portion being distended to many times its normal length, and reinforced or supported by windings of spring-wire upon a solid yielding center piece.

By excluding foreign material from the caoutchouc many advantages are gained in constructing a golf-ball, which is of small size. Foreign material which is comparatively inelastic not only displaces its bulk of the highly-elastic caoutchouc, but by its presence also interferes with the action of the caoutchouc. In other words, the mixing of foreign material makes more work to be done and reduces the amount of the caoutchouc for doing the work. Moreover, by having the caoutchouc approximately pure it is found that a very thin sheet thereof withstands a high degree of tension, so that a multitude of highly-tensioned sheets may be embodied in the allotted space, thus materially augmenting its flying power. Again, by using approximately pure caoutchouc in forming the body the golf-ball is rendered buoyant in water, so that if accidentally driven into a lake or stream it can be readily located and recovered, the caoutchouc preferably more than compensating for the extra weight of the wire windings.

I apprehend that when the ball is given a blow the outer layer or envelop of tensioned caoutchouc is subjected to a still greater tension, said envelop being of spherical form and containing a solid mass, so that the only effect possible to produce by a blow is a change of shape of the ball from a true sphere, which change of shape necessarily stretches said outer layer. I apprehend, further, that the successive inner layers are also subjected to extra tension for the same reason. Since there are a multitude of these highly-tensioned caoutchouc layers and all are simultaneously given an extra tension by a blow from a club, and since their reaction is instantaneous, and especially since they are wound upon a spring-wire-wound center piece of yielding material, the ball flies from the club with phenomenal speed. One important feature of my ball is that its great store of energy cannot be brought into action except by means of a heavy blow, so that it is inactive under a light blow, and hence a good "putter." With this ball a heavier club can be used to advantage than is the case with many other balls, and a harder blow can be given, since the ball is capable of absorbing more energy from the club.

The gutta-percha shell 5 may be formed of hemispherical segments, which are preferably welded upon the filling 4 under heat and pressure. The windings of caoutchouc adhere to one another, thereby improving the stability and elasticity of the ball.

The spring-casing A may be faced upon both sides with fabric layers 6, if desired, to prevent the wire from cutting, especially when thin round wire is used.

Variations may be resorted to within the scope of my improvements, one of the chief features whereof resides in reinforcing tense windings of extremely thin caoutchouc with a series of tense metal springs.

Having described my invention, I claim—

1. In a playing-ball, the combination with a sphere of soft rubber, of a wire spring wound in miscellaneous directions in a tense condition and forming a casing thereon; said sphere being held under compression by said casing; a soft-rubber sphere upon said casing; and a hard, springy cover upon said rubber sphere.

2. In a playing-ball, the combination with a cover, of a series of flat tempered-metal springs confined within said cover and in a tense condition, and an intervening layer consisting of tense windings of soft elastic material.

3. In a playing-ball, the combination with a sphere of yielding material, of a series of metal springs in a tense condition thereon, a cover inclosing said springs, and intermediate tense windings of thin caoutchouc.

4. In a playing-ball, the combination with a sphere of yielding material, of a series of flat tempered-metal springs in a tense condition thereon, a shell of plastic material inclosing said springs, and an intermediate layer of distended soft rubber.

5. In a playing-ball, the combination with a sphere of yielding material, of a series of metal springs in a tense condition thereon, a shell of plastic material holding said springs under compression, and an intervening solid layer consisting of miscellaneous windings of approximately pure caoutchouc.

6. In a playing-ball, the combination with a sphere of soft rubber, of a wire spring wound tightly in miscellaneous directions and forming a casing thereon; said sphere being held under compression by said casing; a cover of plastic material upon said casing, and an intervening layer of flexible highly-resilient material in a state of longitudinal tension.

7. In a playing-ball, the combination with a sphere of soft rubber, of a wire spring wound in miscellaneous directions thereon; a cover of plastic material upon said windings; and an intervening layer consisting of a multitude of windings of extremely thin and highly-tensioned sheet-caoutchouc.

8. In a playing-ball, the combination with a sphere of yielding material, of a series of metal springs in a tense condition thereon, a shell of gutta-percha holding said springs and sphere under compression, and intervening layers of adherent approximately pure caoutchouc.

9. In a playing-ball, the combination with a sphere of yielding material, of a series of metallic hoops binding upon said sphere and forming a lattice-work casing thereon; said hoops being oblong in cross-section and placed flatwise upon said sphere; soft rubber inclosing said casing; and a gutta-percha cover.

10. In a playing-ball, the combination with a sphere of soft rubber of a wire spring wound under tension in miscellaneous directions and forming a casing thereon, a layer of yielding material upon said casing, a layer of fabric next to said spring and a hard cover.

11. In a playing-ball, the combination with a hard cover of a series of flat circular metal springs confined within said cover and in a tense condition, and an intervening layer of soft rubber.

12. In a playing-ball, the combination with a sphere of yielding material and a hard center piece therein, of a series of metallic hoops binding upon said sphere and forming a lattice-work casing thereon, windings thereon of highly-tensioned caoutchouc, and a gutta-percha shell holding said elements under compression.

13. In a playing-ball, the combination with a sphere of tensioned soft rubber having a hard center piece, of a wire spring wound in a tense condition in miscellaneous directions and forming a casing thereon; a cover upon said windings; and an intervening solid layer consisting of tense windings of caoutchouc.

14. In a playing-ball, the combination with a cover, of a series of circular metal springs confined within said cover and in a tense condition and forming a lattice-work sphere, and a solid layer supported by said sphere within said cover and consisting of tensioned sheet-caoutchouc.

15. In a playing-ball, the combination with a tensioned sphere of soft rubber having a hard center piece, of a wire spring wound tightly in miscellaneous directions and forming a casing thereon; a cover of gutta-percha upon said casing; an intervening layer of caoutchouc; and fabric layers within and without said casing.

16. In a playing-ball, the combination with a series of miscellaneous windings of elastic material of a reinforcing series of windings of flat tempered spring metal, and a wear-resisting cover.

FRANCIS H. RICHARDS.

Witnesses:
B. C. STICKNEY,
JOHN O. SEIFERT.